Nov. 14, 1944.  W. H. DE LANCEY  2,362,542
VARIABLE SPEED DRIVING MECHANISM
Filed Oct. 5, 1942  2 Sheets-Sheet 1
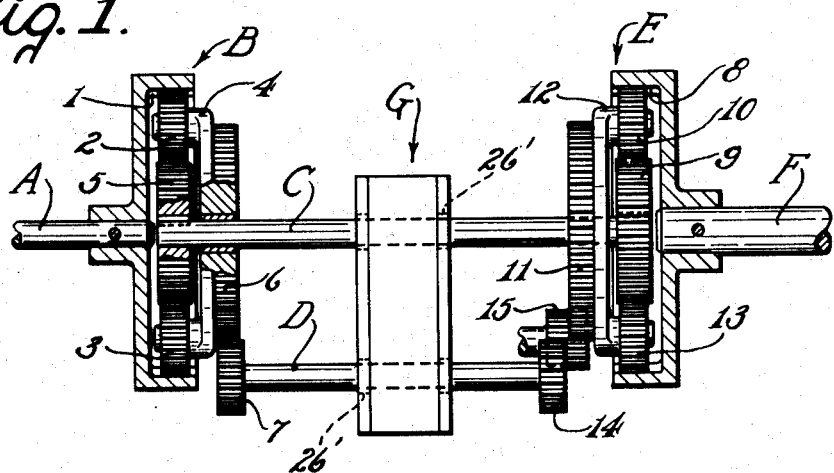
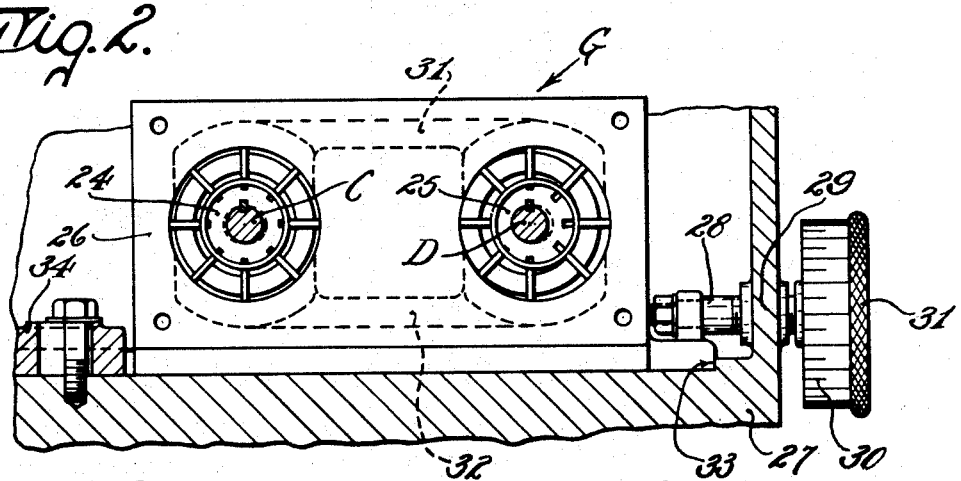
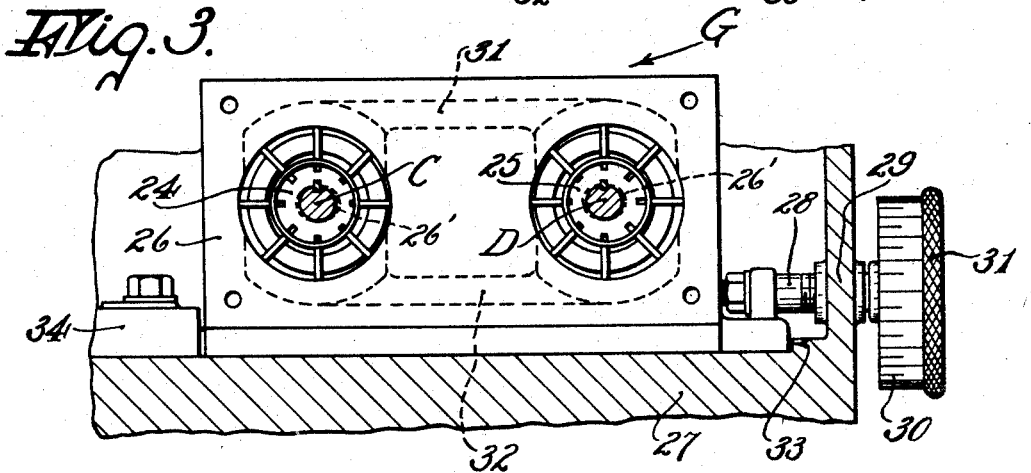
INVENTOR
WARREN H. DE LANCEY
BY
Chapin & Neal
ATTORNEYS Nov. 14, 1944. W. H. DE LANCEY 2,362,542
VARIABLE SPEED DRIVING MECHANISM
Filed Oct. 5, 1942 2 Sheets-Sheet 2
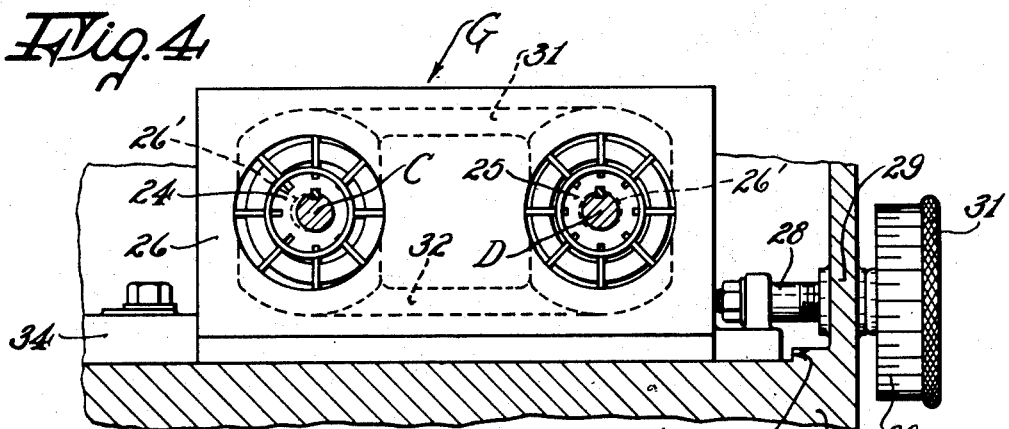
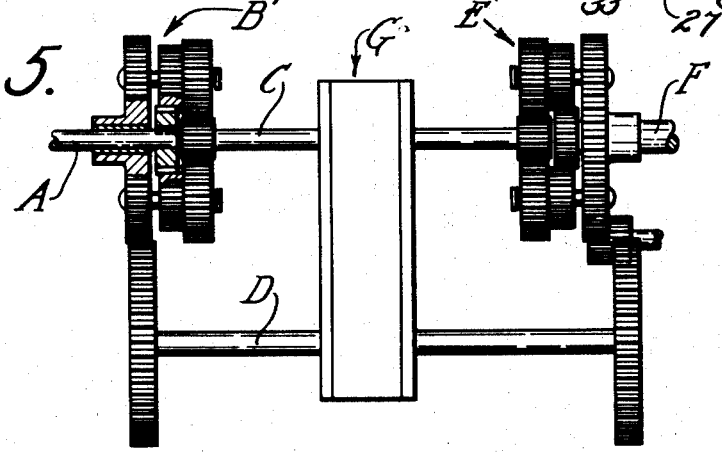
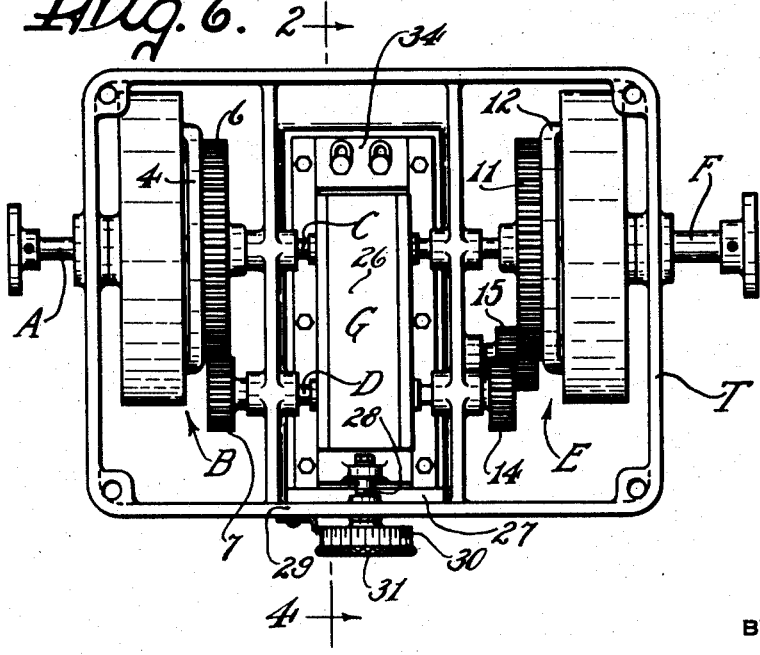
INVENTOR
WARREN H. DE LANCEY
BY
Chapin & Neal
ATTORNEYS Patented Nov. 14, 1944

2,362,542

UNITED STATES PATENT OFFICE 2,362,542

VARIABLE-SPEED DRIVING MECHANISM

Warren H. De Lancey, Springfield, Mass., assignor to Gilbert & Barker Manufacturing Company, West Springfield, Mass., a corporation of Massachusetts Application October 5, 1942, Serial No. 460,748

13 Claims. (Cl. 74—293)

My invention relates to a variable speed driving mechanism. Mechanisms of this class are frequently adjusted for a low speed with a high torque. Prior art mechanisms of the friction driving type are liable to slip when a high torque load is imposed on them. This fact causes trouble and expense in the friction driving type. Prior art mechanisms of the hydraulic type obtain high torque at slow speeds by use of liquid at a relatively high pressure. This type is expensive and has other troubles. Among the purposes of my invention are to avoid the troubles and expense of these friction and hydraulic types of the prior art. I avoid them by providing a better mechanism of the positively geared type.

The invention will be fully disclosed by the drawings and their explanation.

In the drawings—

Fig. 1 is a diagram arrangement showing my combination in its preferred form;

Figs. 2 to 4 inclusive are all cross-sections on line 2—4 of Fig. 6, but indicating three different positions of parts in my adjusting device;

Fig. 5 is a view like Fig. 1 but showing a modified form of differential mechanism per se in my combination; and Fig. 6 shows the combination of elements as they are in Fig. 1 except for dimensions and positions and all as they may be arranged for actual manufacture by way of example.

The structure of Fig. 1 consists in a driving shaft A; a differential mechanism, i. e., a differential B; two parallel shafts C and D with connected gears; a second differential E; a driven shaft F; and a composite adjusting device G.

This combination is one of comparatively few parts. For use it can be packed into a small space, as indicated in Fig. 6. Compared to what it will do, its expense is small.

The purpose of shaft A is to drive differential B. It is the power input shaft of the combination. Differential B is to divide the motion or power of shaft A into two complementary power quantities, one given to shaft C and the other to shaft D. Adjusting device G is for predetermining by adjustment the power division by differential B, so that the shafts C and D will be given the relative quantities of power desired. Differential E is to add the separate motions or power quantities on shafts C and D so as to recombine them and give the resultant to the power output shaft F of the combination. The resultant may have, by the means of my combination, a different arrangement of components in its power than before the power was separated and recombined.

This gives a general view of the elements and their arrangement and their related individual purposes as they are geared together in the combination.

The differential B is of the positively geared type. Internal gear 1 is fast on shaft A. Planet gear 2 meshes with internal gear 1 and is mounted loosely on a bearing pin of planet gear carrier frame 4. Planet gear 3 is arranged the same way in all respects as gear 2 except its position is 180° away from gear 2 for balance. Gears 2 and 3 mesh with sun gear 5 which is fast on shaft C. Gear 6 is loose on shaft C and is fast on planet gear carrier frame 4 and meshes with gear 7 fast on shaft D. The drawing with respect to pitch diameters is substantially to scale for a preferred arrangement of the gearing.

The above gear arrangement is intended to gear up the speed transmitted from shaft A to shaft C or shaft D. Just as an example, if A is turning 1725 R. P. M., shaft C will turn 3450 R. P. M. when shaft D is held stationary. Composite adjusting device G is adapted to hold shaft C or D stationary and also to permit and limit movements of both in inverse proportion, as will be explained later. When shaft C is held stationary, then shaft D will turn 3450 R. P. M. when the speed of shaft A is 1725 R. P. M. By alternately holding one shaft of the two shafts from turning, either shaft C or shaft D may have its speed changed from 0 to 3450 R. P. M., or twice the speed of the power input shaft A. This example illustrates some features of operation due to differential B and its three shafts geared together as shown, which is a preferred form of arrangement. It will be explained later in more detail.

The differential E is in all respects a duplicate of the structure of differential B per se as above described. This duplicate differential structure E, as will be noticed in Fig. 1, is turned around 180° with respect to differential B. Shaft F is fast with internal gear 8. Sun gear 9 is fast on shaft C. Planet gear 10, carried by planet carrier frame 12, meshes with sun gear 9. The planet gear 13 corresponds with gear 10. The gear 11 is fast on the carrier frame 12 and loose on shaft C. The shaft C is one power input shaft for differential E and shaft D is a second power input shaft for this differential. At an end of shaft D is a gear 14. It meshes with an idler gear 15 on a stud shaft and the idler is wide enough to mesh with gear 11. This arrangement with the idler 15, feeds the power from input shaft D to the gear 11 of differential E so that gear 11 has the same direction of rotation as shaft C. If gears 14 and 11 were directly connected, as they would be if idler gear 15 were not placed between them, gear 11 would rotate in the opposite direction to shaft C. The importance of this preferred structure, shown by way of example, and its mode of operation in the combination will later be referred to in detail.

I will now consider the combination illustrated in Fig. 1. A single shaft A will drive both shafts C and D through the differential B. Instead of driving from shaft A, assume that shafts C and D were two driving shafts; then the single shaft A could be driven by the two shafts C and D. This illustrates that the drive is reversible. In the case of shaft A being the driving shaft, then differential B divides the power motion from shaft A and between shafts C and D—while in the reversible drive just above mentioned, shaft A is driven, and differential B adds the power motion from shafts C and D and combines their power for the motion of a single driven shaft A. The combination of the two differentials B and E with the transmitting shafts C and D between them gives both operations—that of dividing the power motion from a single shaft A onto transmitting shafts, and that of adding the power motions from the transmitting shafts and combining them on a single shaft. And, by the plan of the structure in Fig. 1, both operations are carried on simultaneously.

It will be seen from Fig. 1 that differential E is connected to be driven by shafts C and D. The two differentials are conveniently identical structures, as shown. One is driven by a single shaft A to divide the power between two shafts C and D. The other is driven by two shafts C and D to add their power and, with such resultant power, to drive a single shaft F. By inversely varying the interdependent speeds of shafts C and D by a device adapted for this purpose, the speed of the resultant power to drive shaft F can be varied. As an additional feature of the combination, I have provided a device so that the power motions of shafts C and D, not only may be combined, but may be combined when they are arranged in the form of opposing directional motions. This gives a resultant motion, for example, with a speed dependent on the difference of two complementary speeds of shafts C and D. The direction of rotation of this resultant motion may be in either direction, depending on the adjustments of the speeds combined. They are added algebraically to get the result. The device to provide this feature of adjustment for rotation in either direction is provided for by idler 15 in its relation to the other elements of the combination shown in Fig. 1.

The relation of idler 15 will be conveniently seen by considering the connections of differential E and of differential B. If shafts C and D were driven to have differential B add their power for driving shaft A, it will be seen that planet gear carrier frame 4 would be driven in the opposite direction to shaft D. But, when shafts C and D are driven to have differential E add their power, it will be seen that its planet gear carrier frame 12 will be driven in the same direction as shaft D. Idler 15 imposes this condition. The comparison makes clear the fact that the two motions added by differential E are opposing directional motions, while if differential E were connected to shafts C and D exactly as differential B is, the feature of combining opposing directional motions would not be performed in the combination of Fig. 1, as I have provided to have this done. I have made the comparison with the operation of differential B, assuming it to be driven by shafts C and D to combine motions for a resultant motion to drive shaft A. It should be clear that as shaft A can drive shafts C and D, these shafts can drive instead shaft A and the latter be given the same power in speed and direction of rotation as it had when it was driving. But such would not be the case, assuming that both shafts C and D were operating driving shafts, if the direction of rotation of one of the two motions were reversed in driving back to shaft A. And this latter is the comparable condition when both shafts C and D are used in my combination of Fig. 1 to drive differential E which is identical in structure to differential B. The combination would be useful if idler 15 were omitted and gear 14 meshed directly with gear 11. But it is much more useful as I disclose it because the range of speed adjustments is thereby greatly increased. To make the combination operate adjustably, device G or its equivalent is needed. Its function is to control by adjustment and in a positive way, the interdependent speeds of shafts C and D.

Adjustable device G in my combination is a preferred form. Its main purpose is to predetermine any one of many speed ratios between shafts C and D and impose that ratio on said shafts and do this in a positive way in the combination. When the combination is in operation, all adjustments in the speeds of shafts C and D are made positively in inverse proportion. When one is increased, the other is dependently decreased.

A desirable characteristic of the adjusting device is to positively impose the desired predetermined speed ratios for shafts C and D.

The structure of device G, as shown in Fig. 2. discloses its adjusted position to hold shaft D of Fig. 1 stationary and permit free, substantially unretarded turning of shaft C. Casing 26 is slidably mounted, for example, in a dovetail guiding arrangement, or in any other suitable manner. This guiding arrangement is merely indicated by table portion 27 with threaded rod 28 mounted to turn in a threaded part 29 fast to the table, the rod being connected to a lug of the casing 26, as indicated. The casing is movable between stops 33 and 34, at least one of which, as 34, is adjustable, as indicated. The scale 30 indicates calibrations for different predetermined postions of adjustment. As the operating head 31 of rod 28 is turned one way or the other, the casing 26 can be moved back and forth at right angles to shafts C and D. These shafts C and D pass through slots 26' in the side walls of casing 26, and these slots enable the casing to slide in the described direction.

As shown, rotary pump structure is provided, including two rotors 24 and 25 which are respectively fixed to shafts C and D. These rotors can turn, but they are not otherwise movable except that their blades, as indicated, can slide in and out radially in their slots in the characteristic way of rotary pumps. They slide in and out for their ends to seal the spaces between blades, the rotor body, and the casing cavity in which the rotor turns. Casing 26 has two cavities, one for each rotor. These cavities are so placed in the casing that any casing movement for adjustment will adjust both cavities with respect to both rotors and will determine how the rotors with their blades may work in their respective cavities. For example, in Fig. 2 the rotor 25 with respect to its cavity, has been related by adjustment for the working position of maximum pumping capacity. While the same casing adjustment dependently provides for a zero pumping capacity for the rotor 24 in its cavity. These two cavities are connected by casing conduits 31 and 32. The conduits provide, by their connections, for a closed liquid filled circuit. The outlet of one rotary pump structure is connected to the inlet of the other rotary pump structure, and vice versa.

Inspection will show that I have provided two variable capacity rotary pump structures—both operable on the same liquid circuit, which is a closed circuit; both have their capacities made variable by varying the position of their common casing 26. A variable capacity rotary pump per se is very well known. I have disclosed a composite structure using two such pumps for my purpose.

With device G adjusted as in Fig. 2, the particular operation will be described. The operation of the combination of Fig. 1 already described makes shaft A tend to turn both shafts C and D through differential B and in the same direction. Shaft C can turn rotor 24 of Fig. 2 without obstruction for this reason. Inspection will show the rotor blades of part 24 extending to the cavity wall for this rotor, with equal amounts of "pumping" pockets all the way around. The result is that the blades are kept in position as 24 turns, so they can move no more liquid from the inlet to the outlet than from the outlet to the inlet, assuming of course the closed liquid system is full. Therefore, the liquid around rotor 24 goes around and around and there is no tendency to pump. There is no substantial obstruction to free rotation of shaft C. But the tendency for turning shaft D is completely obstructed by device G, adjusted as in Fig. 2. Rotor 25 is in the position of maximum pumping capacity. The tendency is to pump liquid between inlet and outlet without moving any liquid from outlet to inlet in the cavity of rotor 25. But this tendency to pump out of that cavity is completely blocked due to the fact that the other cavity beyond is already full of liquid moving in an eddy only. Such eddy has no way to relieve itself. The rotor moving it is in "balance." No matter how much liquid pressure is put on its inlet side, its blades on opposite sides of the rotor balance such pressure and cancel any effect from such pressure. Since rotor 25 with its adjusted position of maximum pumping capacity has no place to which its liquid can be moved, this rotor 25 is then completely choked and turning of shaft D is completely obstructed.

The adjusted position of Fig. 4 is the full reverse of that of Fig. 2. In Fig. 4, rotor 25 has no pumping capacity; rotor 24 has maximum pumping capacity, so shaft D is free to turn and shaft C is completely obstructed and it cannot turn. The reasons will be obvious from the previous case explained with respect to Fig. 2.

In Fig. 3 the adjustment of casing 26 is as shown, to give both rotors 24 and 25 the same capacity for pumping. When shaft A of Fig. 1 tends to turn shafts C and D through differential B, neither C nor D is prevented and both turn. Shaft C turns rotor 24 and shaft D turns rotor 25. They both now have the same pumping capacity. The result is that rotor 24 pumps into rotor 25, and rotor 25 pumps into rotor 24. The liquid goes around its closed circuit and both shafts C and D are equally free to turn so far as any obstruction of the adjusting device is concerned. But both shafts must turn at the same speed.

Of course there is a conversion loss in changing from mechanical to hydraulic and back to mechanical power between shafts C and D. This can be taken into account in the design of the apparatus for particular uses. It should be clear that the adjusting device G operates on a different principle than that of controlling the speed ratio of shafts C and D by friction brakes or their equivalent. One difference is that device G is a power transmitting device to save some power whereas a brake dissipates all the power used for the speed control. Another difference is that device G is positive in its action whereas a friction brake is not.

It can be seen that casing 26 may be adjusted by increments from the extreme position of Fig. 2 to that of Fig. 4 and an infinite number of adjustments are possible in the range. I have discussed the extremes and the middle or balanced adjustment.

Consider an adjustment by which rotor 25 is given greater pumping capacity than rotor 24 and that the latter is given some pumping capacity. This differs from the adjustment of Fig. 2. In such a case rotor 25 tends to pump more liquid to rotor 24 than the latter can pump at the same speed as rotor 25. The tendency toward excess liquid is compensated for by the necessary slowing down of rotor 25 and speeding up of rotor 24, one relatively to the other, providing a relative speed adjustment. By slower speed the quantity of liquid pumped, although rotor 25 has the larger pumping capacity, becomes the same quantity as pumped by rotor 24 operating at a relatively higher speed. The latter must operate at a higher speed than rotor 25 so that the same liquid quantity, a necessary condition in the full and closed liquid circuit, must be pumped by both rotors in a given time. By adjusting their capacities, one greater than the other, the rotor shafts are absolutely required to operate at speeds one greater than the other. And, with both rotors turning under the physical conditions of the structure, the rotor speeds must vary in inverse proportion to any variation given the capacities of the rotor pump structures. The pump structures are of the positive displacement type. They operate on positive gear trains from shaft A through the differential to both shafts C and D to the pump structures. This arrangement gives a positively geared drive and a positive type of control.

It is now clear upon detailed consideration of the disclosure that adjusting device G causes a reaction through shafts C and D to determine the relative operation of the geared parts in differential B and that the operation of this differential makes it possible to mechanically and adjustably divide the power in the motion of shaft A between shaft C and shaft D. It is important, as I view the subject, to predetermine and adjust for and with certainty get an accurate division of motion between these two shafts. By my device G and the differential gearing from shaft A to shaft C and shaft D, the motion of shaft A can be divided and complementary quantities placed one on C and the other on D. The rule of pure mechanics involved in these positively geared means of transmission is that any variation in the motions of the complementary quantities of power must be in inverse proportion for the two motions. And in my combination all sorts of predetermined variations are feasible by adjusting device G. The power of shaft A can thus be analytically divided with precision and the precise power components adjusted to predetermined values, one arrangement of components on shaft C and another arrangement of components on shaft D.

I have now shown how a high speed power shaft A is geared by differential B to the two parallel shafts C and D for the purpose of apportioning the power of shaft A. I have shown also, as indicated by the gearing, how device G by adjustment can provide for shaft C or shaft D to have a higher speed than shaft A when one is held stationary. And I have shown how the speeds of shaft C or shaft D may be inversely varied from zero to more than the speed of shaft A. By gearing I illustrate the idea of having high speeds available for shafts C and D. It is an advantage to transmit power by high speed, as far as it is otherwise feasible to do so. As mentioned before, parallel shafts C and D both rotate in the same direction. I prefer this arrangement but it could be varied. With shafts C and D turning in the same direction, some of the explanation will be simplified, as well as the structure. The purpose of the structure up through the operation of shaft A, shafts C and D, and adjusting device G has been referred to before, but I will now refer to it more specifically.

It is already clear that the power of shaft A can be apportioned between shafts C and D and in any proportion from zero on one parallel shaft to the whole power on the other parallel shaft, and vice versa. As an illustration, suppose I divide the power of shaft A, operating at high speed and with a constant power quantity, making the division very nearly but not quite equally between shafts C and D. Suppose I give shaft D the slight excess power as compared with shaft C. In such a case shaft D will rotate with a power slightly in excess of shaft C. From the gearing mentioned above the parallel shafts will turn in the same direction. But both shafts will turn with nearly half the power of shaft A. Under the conditions, shafts A, C, and D can be high speed shafts.

Now, under the conditions I have thus prepared for, when I reverse the direction of rotation of the motion taken by differential E from shaft D and combine it with the motion taken from shaft C by the same differential, the resultant motion from the two opposing motions may have the speed of but a few revolutions per minute. The resultant of a few revolutions per minute speed, in the example given, will have its direction of rotation determined by the direction of the motion from shaft D as it is finally applied in the differential. The power of this resultant motion will be the same as the whole power taken from shaft A minus the loss due to operating the subsidiary transmission. As compared with shaft A, the resultant motion wil have an extremely low speed and an extremely high torque. While very low speeds may be adjusted for, the transmission will be more efficient in the range of speeds between the highest and a relatively low speed but not too close to zero. For example with the speed of shaft A at about 1700 R. P. M. the speed of shaft F may vary from that speed to about half of it and be in a desirable working range. By this I do not mean to limit the possible range of adjustments but to mention by the example the range where the efficiency is better than it is in a different range. This can be taken into consideration when designing the apparatus for particular uses. Of course the particular speed at which the transmission will operate over the longest period of time in any particular use will be an important factor of design in the gearing, and of the whole combination for that use.

It will help the understanding to follow through the gearing, considering directions of motion. In the illustrated case of Fig. 1, let A have a clockwise rotation. Gear 5 and shaft C will turn counterclockwise. Gear 6 will turn clockwise and shaft D counterclockwise. Gear 11 will turn counterclockwise on account of idler 15 giving it the same direction as shaft D. Gear 9, on shaft C, will turn counterclockwise. Gear 11 and gear 9 will be seen to rotate in the same direction. In the case of the speed and power relations given above, the axis of the planet gear 10 will move with its carrier frame and relatively around the circumference of gear 9 and in a counterclockwise direction. They will both be moving fast. Their movements relatively will have a small difference. This difference in speed will cause a rotation of gear 10—that is, a rotation in addition to its mere rotation as an idler between gears 8 and 9. The rotation thus caused by said difference in speed will drive internal gear 8 in a positive manner. Gear 10 will be rotated counterclockwise and rotate internal gear 8 counterclockwise, i. e., when the power taken from shaft D is greater than that taken from shaft C. The speed of this drive is a very slow speed because it is due to the difference which is small between two high speeds of gears 9 and 11. Thus, shaft F, which is shown of larger diameter than shaft A to indicate that it takes a high torque, will be given a very slow power drive with a very high torque, the rotation of shaft F being in the opposite direction to the rotation of A. If device G were moved so as to give shaft C a greater power than shaft D, then the torque motion of shaft F would be in the same direction of rotation as the motion of shaft A. And from what has been said, it should now be clear that a great many sorts of adjustments for a great many different arrangements of speed and torque in either direction of rotation could be taken as specific examples. The plan of my structure enables me to adjust for a predetermined arrangement of power components to use on output shaft F which may differ widely from a constant arrangement of components in the same power quantity on power shaft A. From this point of view my structure is a power components variator.

The rearrangement of values of power components in which I am particularly interested are variable values of speed and torque. As device G is adjusted by increments, the shafts C and D have their power ratios accurately and progressively varied from one predetermined ratio to another.

Positive gearing to transmit power from a high speed shaft for the greatest torque value to put on a working shaft is a perfectly simple matter per se. The difficulty arises when the same type of gearing, i. e., positive gearing, is wanted in adjustable form, in a self-contained mechanism, at reasonable cost and with small space requirements, to give all the speed and torque ranges wanted on a work shaft when using the power from a single high speed shaft. I have given the case of wanting a very high torque value which necessitates a very low speed value. If too great torque value is attempted, as when the drive is overloaded, the point of balance is reached when the excess torque value extinguishes the speed. This means simply that a greater torque load is imposed than can be derived from the available power in the motion of shaft A to carry that load. However, it will be noticed that by my positively geared variable driving mechanism there is no danger of slipping when zero speed is approached for high torque values.

In contrast to the case of the greatest torque value wanted, we may consider wanting the work shaft to have the same speed as the power shaft. It is of advantage to provide that this speed may be in the same or in the opposite direction. My combination is adapted to adjust for the same speed in either direction and for all the range of possible speeds between these two extremes. Under the conditions, the range of possible torque values is the same as the range of speed values—a range between the greatest and least torque values in either direction that can be derived from the speeds stated—that is, between the same speed in either direction of rotation.

An example of utility in the combination of Fig. 1 will now be given. It may be driven by an electric motor which we will assume has a shaft speed of 1725 R. P. M. for its economical operation. The motor shaft will be coupled to shaft A. A machine is to be driven which we will assume has its main shaft coupled to shaft F. We will assume that the machine's main shaft is usefully driven at a top speed of 1725 R. P. M. but that it is highly desirable to vary the speed and especially to vary the torque of the main shaft according to the machine work. A high torque component of the main shaft drive in many machines is sometimes wanted above everything else. With my structure the shaft D may be held stationary and shaft C left unretarded by adjusting device G. Then shaft F and the main shaft of the driven machine will rotate at the speed of 1725 R. P. M., both in the same direction as shaft A. While the shaft C is geared up through differential B to run at twice the speed of shaft A under the conditions described, it is likewise true that shaft C is geared down through differential E so that shaft F will run at half the speed of shaft C. The same applies to shaft D when shaft C is stationary. Shaft D is geared down through differential E in the same proportion as it is geared up through differential B. If shaft C is held stationary and shaft D left unretarded, the main shaft of the machine will rotate at the speed of 1725 R. P. M. in the opposite direction to shaft A. By adjusting device G in increments so as to variably and inversely and positively retard shafts C and D between the two extremes just stated, the speed and the torque will be varied inversely between their extreme values. Usable speed of shaft F for the main shaft of a driven machine can be adjusted to anything short of zero and in either direction of rotation.

When the speed adjustment is for a very low speed, the planet gears 10 and 13 of differential E are operating very fast. They are the gears which drive internal gear 8. They merely roll around internal gear 8 for the most part without any driving action. The driving action occurs when the power on gears 9 and 11 differs. When the power on gears 9 and 11 differs by the least bit, there is the least speed of driving action. If gear 9 dominates, planet gears 10 and 11 will drive gear 8 in one direction, the same as shaft A. If gear 11 dominates, the drive will reverse its direction. This condition of transmitting power by two fast turning gears and having a slow turning gear take the power by a predetermined difference in powers of the fast turning gears, is a good conditions for getting the power application of high torque values. When my structure is operated to vary the components of the power taken from shaft A to raise it to a high torque value for application on shaft F, the gears and shafts transmitting the power all operate at high speed. It is only the final driven gear 8 which operates at low speed. A main purpose of my device is to convert a single shaft, high speed, relatively low torque power motion to a single shaft, low speed, high torque power motion, and to exactly adjust for variations in doing so, and to transmit the power by positively geared means.

If shaft C and shaft D are correctly retarded by device G, according to the appropriate calibration of scale 30, then shaft F will stand idle. Thus, the structure has the function of a clutch as the power from shaft A can be connected and disconnected from shaft F.

There are all sorts of uses to which the improved transmission may be put to advantage. One that I particularly emphasize is to use it as a simple, inexpensive accessory between any common electric motor and any power machine tool that needs a variable drive. Such use will avoid the trouble of special types and kinds of motors for special machines. It will also avoid building in special transmissions in machine tools such as lathes. A lathe of ordinary construction can be given all the variable power facilities of a much more expensive construction with respect to its variable speed and torque capacity. This field is but one of many competitive fields of utility in which my invention will be useful as an improvement. But the improved structure of my invention is particularly well adapted also to use as a built-in transmission for power when many adjustments are wanted in any machine.

I have shown in Fig. 1 my preferred construction, the best one now known to me. But its disclosure will suggest many variations to the skilled mechanic. By way of example, the idler 15 could be connected between gears 6 and 7 instead of between gears 14 and 11. In that case shafts C and D would turn in opposite directions instead of in the same direction. This would require crossing the closed circuit in casing 26 of adjusting device G. The feed and inlet passages in its two rotary pump structures would need to be changed so that while the rotors turned in opposite directions, one would be made to "pump" into the inlet port of the other.

It will be understood that suitable means will be provided to prevent leakage of liquid from the pump chambers in the device G. Should liquid leak past either end face of a pump rotor and reach the shaft C or D, the passage of such liquid along the shaft and out of casing 26 through the holes 26' can be prevented by seal rings on such shaft bearing against the end plate of the casing 26 and closing the holes 26'.

I have shown in Fig. 5 a modification of the structure of Fig. 1. In this modification the differentials are B' and E'. Their type differs from differentials B and E of Fig. 1. Differential mechanisms or differentials per se are of many known types. Some have an internal gear on the input or output shaft, as in Fig. 1, and some do not, as in Fig. 5. Some use bevel gears. But my disclosure is not intended to emphasize one over the other type of differential per se. My invention is in the combination of two differentials with other related elements. After the operation and purpose are understood in one form, the combination can be made in various forms of elements per se. My modification of Fig. 5 is to illustrate the point. The gearing of the modified form of differential will be readily seen from the drawings. It is of the sun and planet gear type, without any internal gears. Otherwise, the arrangement of the combination is generally the same as shown in Fig. 1.

In Fig. 6 I have indicated the parts of Fig. 1 as they could be condensed for commercial manufacture. The transmission box is marked T. The other parts correspond with the diagram of Fig. 1, except that they are mounted in bearings of the box. But of course the invention could be made up in all sorts of specific forms.

I have disclosed my invention both by drawings and specific description. The description of the involved motions in one differential is difficult for one to give and another to understand by written words. And when a description of the motions of two differentials with parts connected by gear trains for imposing related operations of parts in both and also for predetermining variations by adjustment, as in the present case, accurate description that cannot be misinterpreted becomes extremely involved and difficult. Consequently, I rely for my disclosure on the drawings per se, on the description per se, and upon one modified by the other if either one discloses error by exhaustive analysis. I wish to emphasize this fact, that when a skilled mechanic takes two differentials, two shafts connecting the two differentials, an adjusting device to impose any predetermined speed ratio in a positive way over a wide range of ratios between the two shafts and makes connections between elements substantially as I have disclosed it and as he is expected to do with the skill of his calling, he can practice my invention and in the best manner now known to me. It is not necessary for him to know or understand why it is that one differential combined with another and with an appropriate adjusting device for varying the speeds interdependently, functioning between them, will give the results I attain. But if the skilled mechanic will build the structure and adjust the speeds of the shaft all substantially as I have directed, and for its purpose, the structure will be the power components variator, i. e., the improved variable speed drive of my invention. He can make many variations.

I claim as my invention:

1. A transmission comprising two differential mechanisms of the positively geared type, a power input shaft and a power output shaft, one differential mechanism for the purpose of apportioning the motion of the input shaft by which it is driven into two motions each to drive a different gear part of the other differential mechanism, the latter for the purpose of integrating such two motions and to turn the power output shaft by the result of such integration, two intermediate shafts receiving the apportioned motions and connecting appropriate gears of said two differential mechanisms for one to operate the other, a variable capacity rotary pump structure of the positive displacement type with rotary parts thereof independently fixed one to one and one to the other of said intermediate shafts, means providing a closed liquid circuit in which said rotary parts work, said pump structure including means to adjust its pumping capacity whereby the liquid of the closed circuit will require the speeds of the two intermediate shafts to vary always in inverse proportion, said rotary pump structure with its closed circuit being operable as a positively acting means for establishing any one of an infinite number of speed variations between the two connected intermediate shafts whereby the power from said input and output shafts can be transmitted in the way and with the result desired with respect to the proportions in arrangement of power components on the output shaft.

2. In combination for the purpose described, a main power driving shaft and a main power driven shaft, a differential mechanism of the planet gear type with its planet gearing driven by gear connection to the main driving shaft, a second differential mechanism of the same type as the first one, a transmitting shaft fixed to the sun gears of the two differentials, a second transmitting shaft, gear connections between the last-named shaft and the planet gear carriers of the two differentials to turn said carriers in opposite directions, a composite adjusting device adapted to impose a constant relation between the speeds of the two transmitting shafts and to vary such speeds, but only in inverse proportion so as to maintain their constant relation, the two differentials permitting such variation and relation, and an internal gear connection between the planet gearing of the second differential and the main power driven shaft.

3. A self-contained transmission unit adapted for bodily insertion between the drive shaft of a prime mover, for example an electric motor, and the main shaft of a machine to be driven by such motor, said unit comprising a transmission box with bearings and in the box two differential mechanisms of the positively geared type, the planet gear type for example, two transmission shafts and gears correspondingly connecting said differentials one with the other by correspondingly gearing the transmitting shafts with planet gear carriers for example, an adjusting device positively operable upon both transmitting shafts without slip to require their speeds to be held in proportion and providing for adjusting their speeds in inverse proportion, one differential having a main shaft to couple with the main drive shaft of such a prime mover and the other differential having a main shaft to correspondingly couple it to the main driven shaft of such a machine, the said main differential shafts being correspondingly geared to their respective differentials by gear connection with planet gears for example, all constructed and arranged for the purpose described.

4. In a variable speed driving transmission, the combination of a power input shaft, a differential of the positively geared type driven by said shaft, two power output shafts driven by said differential, an adjusting device for the purpose of adjustably controlling the speeds of the two power output shafts, said shafts being geared to said differential so as to make their speeds interdependent and the variation of one speed to cause an inverse variation of the other speed, said adjusting device including two cooperating speed retarding means, one for each output shaft, adapted to hold one output shaft stationary when the other output shaft is unretarded, means for gradually shifting the adjustments of said retarding means from one extreme to the other, that is, from holding one output shaft stationary to holding the other output shaft stationary, the retarding means adapted to act reversely and gradually on said shafts between said extremes during said shifting movement, a second differential to which said two output shafts are geared, the latter connections being made to drive the gears of the second differential which correspond to the gears of the first differential, as connected to drive the same two shafts, and a power output shaft connected to the second differential in the manner corresponding to the power input shaft, as connected to drive the first differential.

5. In variable speed driving mechanism the combination of a differential gear set for a driving shaft, another differential gear set for a driven shaft, two intermediate shafts each one connected to gear units of both differential gear sets, a complete subsidiary transmission device consisting in a variable speed positively acting hydraulic drive having two interrelated units connected between said intermediate shafts and adapted to impose on such intermediate shafts one of any number of speed ratios in their operation, all for the purpose described.

6. A variable speed driving mechanism, comprising in combination a driving shaft, two complementary transmitting shafts, a differential gear set having its three units positively connected one to each of said three shafts, means to predetermine the division of power from the driving shaft, through the differential gear set to the complementary transmitting shafts, said means comprising a positively acting cross driving device connected apart from the differential gear set, between the transmitting shafts and adapted for either one to drive the other in a subsidiary capacity, said cross driving device being of the kind adapted by adjustment to impose one of any number of speed ratios for the operation of said transmitting shafts, whereby as such shafts are driven by said driving shaft through said differential gear set, the division of the power through the latter is adjustably and positively controlled, a power driven shaft, a second differential gear set having its three units connected one unit to said driven shaft and the other two units to said two complementary transmission shafts, all constructed and arranged for the purpose described.

7. In a variable speed transmission, a single main driving shaft, a differential gear set driven thereby for proportioning the driving shaft motion into a plurality of interdependent and complementary motions, a plurality of subsidiary shafts geared to the differential gear set to take such plurality of motions, an infinitely variable adjustable and positively acting driving apparatus coupling the subsidiary shafts and adapted to drive any one by the other to predetermine one of any number of speed ratios according to a particular adjustment, a second differential gear set driven by the subsidiary shafts for recombining their motions, and a single main driven shaft driven by the second differential with the motion resulting from recombining said interdependent and complementary motions as adjusted on the subsidiary shafts, all for the purpose described of dividing, adjusting, and recombining the motion of the driving power to change its characteristics.

8. A positive infinitely variable driving mechanism adapted to connect a single driving shaft and a single driven shaft, comprising a transmission having a single input shaft for driving and a single output shaft to be driven, a differential of the positive gear type and gear driven by the input shaft, another differential of like type to gear drive the output shaft, two transmission shafts each mounted to be gear driven by part of one differential and to gear drive a part of the other differential, an adjusting device made up as a speed changing positive driving device, connected as a power bridge between the two transmission shafts, and including means to adjust their speeds to one of an infinite number of speed ratios, said device being adapted by its capacity in combination with the two differentials, not only to inversely vary the speeds of the transmission shafts, but also to inversely and infinitely vary the proportions of power flowing through the two transmission shafts in a positively acting manner.

9. In variable speed driving mechanism, the combination of a differential gear for taking power from a single driving shaft, another differential gear for putting power on a single driven shaft, two shafts, each one gear connected to parts of both differential gears for carrying complementary portions of the power between the differential gears, an adjusting device made up of a speed changing positively acting transmission connected as a power bridge between said two shafts, said device adapted to positively vary the shaft speeds inversely, to carry all the power used for the latter purpose between said two shafts, and to impose one of any number of speed ratios on them according to a corresponding adjustment, all for the purpose described.

10. A variable speed transmission of the mechanical type made up of a differential gear set for positive connection to a main driving or power input shaft, another differential gear set for positive connection to a main driven or power output shaft, a transmission shaft positively connected to parts of both differential gear sets and adapted, when said differentials are suitably adjusted, to connect the main shafts for a one-to-one speed ratio, a second transmission shaft positively connected to other parts of both differential gear sets and adapted when said differentials are suitably adjusted to connect the main shafts for a one-to-one speed ratio but with a reversal of rotation, a device to suitably adjust said differentials not only for said named speed ratios between the main shafts but also for any one of the speed ratios between the limits of those stated, said device made up of an infinitely variable speed changing and positive drive for coupling one transmission shaft with the other transmission shaft and adapted by adjustments of such a speed changing drive to inversely vary the speeds of the transmission shafts and simultaneously vary the adjustments of both differential gear sets all without any possibility of slipping in the transmission as a whole.

11. In apparatus for the purpose described the combination of two transmission shafts, an infinitely variable speed changing and positive drive connecting said shafts for the purpose of varying their speed ratios, a differential gear set having different parts gear connected to said shafts, a second differential gear set having different parts gear connected to said shafts, a power input shaft to gear drive one differential gear set, a power output shaft to be gear driven by the other differential gear set, the combination being characterized by positive driving gear trains to transmit the main power flow from input to output shafts and a subsidiary power flow positively transmitted between the two transmission shafts in one or the other direction through said speed changing drive and according to the power needed to be transferred for adjusting the speed ratios between said shafts, all for finally adjusting the speed ratio for the single input and single output shaft of the apparatus.

12. The combination of a pair of main shafts, a pair of differential gear sets, a pair of intermediate shafts, and a pair of positive displacement pumps, all arranged in the following relations; a main shaft to drive one differential, that differential to drive and be controlled by the speed ratio of the intermediate shafts, those shafts to drive and control the other differential, the latter to drive the other main shaft with power characterized according to the control of the two differentials, and the pumps adapted to control said differentials being arranged for operation in a liquid filled closed pumping circuit, for one to sometimes operate the other as a liquid motor and each connected in positive driving relation with an opposite one of the intermediate shafts, said pumps including readily adjustable means operable at the will of an attendant to vary their relative capacities, to cause a variation in their speed ratio, to vary the speed ratio of said intermediate shafts and thus control both differential gear sets to cause a desired adjustment of speed factors for use on the driven shaft.

13. The combination of a pair of main shafts, a pair of differential gear sets, a pair of intermediate shafts, and a pair of positive displacement pumps of variable capacity, having a scope between zero and equal capacities, all arranged in the following relation; a main shaft to drive one differential, that differential to drive and be controlled by any speed ratio imposed on the intermediate shafts, those shafts to drive and also control the other differential by any speed ratio imposed on such shafts, the latter differential to drive the other main shaft according to the control of the two differentials, and the pumps adapted to control said differentials being arranged for operation in a liquid filled closed circuit, for one to sometimes operate the other as a liquid motor, for one to sometimes operate without any capacity and cause the other to stand still according to their variable capacity adjustments, and each pump connected in positive driving relation with an opposite one of the intermediate shafts, said pumps including readily adjustable means operable at the will of an attendant to vary their relative capacities, to cause a variation in their speed ratio, to vary the speed ratio of said intermediate shafts and thus control both differential gear sets to cause a broad scope of adjustment of speed factors on the driven shaft.

WARREN H. DE LANCEY.